(12) United States Patent
Cornwall et al.

(10) Patent No.: US 9,955,237 B2
(45) Date of Patent: Apr. 24, 2018

(54) METHODS AND APPARATUS TO LOCATE UTILITY METER ENDPOINTS OF INTEREST

(71) Applicant: Itron, Inc., Liberty Lake, WA (US)

(72) Inventors: Mark Cornwall, Spokane, WA (US); Asa Jay Laughton, Medical Lake, WA (US)

(73) Assignee: Itron, Inc., Liberty Lake, WA (US)

( * ) Notice: Subject to any disclaimer, the term of this patent is extended or adjusted under 35 U.S.C. 154(b) by 8 days.

(21) Appl. No.: 14/483,901

(22) Filed: Sep. 11, 2014

(65) Prior Publication Data
US 2016/0080837 A1 Mar. 17, 2016

(51) Int. Cl.
| G08B 23/00 | (2006.01) |
| H04Q 9/00 | (2006.01) |
| G01S 5/14 | (2006.01) |
| G01S 11/06 | (2006.01) |
| G01D 4/00 | (2006.01) |

(52) U.S. Cl.
CPC ............... *H04Q 9/00* (2013.01); *G01S 5/14* (2013.01); *G01S 11/06* (2013.01); *G01D 4/002* (2013.01); *Y02B 90/241* (2013.01); *Y04S 20/32* (2013.01)

(58) Field of Classification Search
CPC ...................................................... H04L 12/12
USPC ........................................ 340/870.01, 870.02
See application file for complete search history.

(56) References Cited

U.S. PATENT DOCUMENTS

| 6,754,488 | B1 | 6/2004 | Won et al. |
| 7,116,988 | B2 | 10/2006 | Dietrich et al. |
| 7,403,762 | B2 | 7/2008 | Morgan et al. |
| 7,847,707 | B2 | 12/2010 | Bakken et al. |
| 8,242,887 | B2 | 8/2012 | Cornwall et al. |
| 8,552,910 | B2 | 10/2013 | Cornwall et al. |
| 2002/0001339 | A1 | 1/2002 | Dooley et al. |
| 2004/0114737 | A1* | 6/2004 | MacConnell ........... H04L 12/12 379/106.03 |
| 2004/0233100 | A1 | 11/2004 | Dibble et al. |
| 2005/0193149 | A1 | 9/2005 | Boyd |
| 2006/0022841 | A1 | 2/2006 | Hoiness et al. |
| 2006/0074601 | A1 | 4/2006 | Hoiness et al. |
| 2006/0075131 | A1* | 4/2006 | Douglas ................ G01S 5/0252 709/230 |
| 2006/0242323 | A1 | 10/2006 | Sanderford, Jr. et al. |

(Continued)

OTHER PUBLICATIONS

Patent Cooperation Treaty, "International Search Report," issued in connection with International Patent Application No. PCT/US2015/048622, dated Nov. 19, 2015 (4 pages).

(Continued)

*Primary Examiner* — Amine Benlagsir
(74) *Attorney, Agent, or Firm* — Hanley, Flight & Zimmerman, LLC

(57) ABSTRACT

Methods and apparatus are disclosed to determine the location of endpoints of interest. An example method involves in response to detecting a transmission from the endpoint, determining whether the endpoint is an endpoint of interest. If the endpoint is the endpoint of interest, the example method involves sending a first command to the endpoint to increase a transmission rate of the endpoint, determining an estimated location of the endpoint using signal strengths of subsequent transmissions from the endpoint, and enabling the transmission rate of the endpoint to decrease.

23 Claims, 7 Drawing Sheets

(56) References Cited

U.S. PATENT DOCUMENTS

| | | | |
|---|---|---|---|
| 2007/0057812 A1 | 3/2007 | Cornwall | |
| 2010/0007521 A1 | 1/2010 | Cornwall | |
| 2010/0066503 A1* | 3/2010 | Rhie | G01S 1/68 340/10.1 |
| 2010/0302102 A1 | 12/2010 | Desai et al. | |
| 2011/0068947 A1* | 3/2011 | Holman | G01D 4/004 340/870.02 |
| 2011/0082918 A1* | 4/2011 | Karaoguz | H04L 67/14 709/220 |
| 2012/0062390 A1* | 3/2012 | Solomon | H04Q 9/00 340/870.03 |
| 2012/0072106 A1* | 3/2012 | Han | G01C 21/206 701/410 |
| 2013/0219454 A1* | 8/2013 | Hewinson | H04L 63/10 726/1 |
| 2014/0087758 A1* | 3/2014 | Maor | G01S 5/0252 455/456.1 |

OTHER PUBLICATIONS

Patent Cooperation Treaty, "Written Opinion," issued in connection with International Patent Application No. PCT/US2015/048622, dated Nov. 19, 2015 (8 pages).

International Bureau, "International Preliminary Report on Patentability," issued in connection with International application No. PCT/US2015/048622, dated Mar. 23, 2017 (10 pages).

\* cited by examiner

METHODS AND APPARATUS TO LOCATE UTILITY METER ENDPOINTS OF INTEREST

FIELD OF THE DISCLOSURE

This disclosure relates generally to utility meter reading, and, more particularly, to locating endpoints of interest.

BACKGROUND

Utility providers install, maintain, and/or collect utility usage data from endpoints within an automatic meter reading (AMR) collection network. These endpoints are data collection and transmitting devices that are either installed on existing utility meters or are integrated into the utility meters. Often, the endpoints communicate with data collection units (DCU) through radio frequency (RF) communication. Some endpoints transmit meter data at preset periodic intervals without any external prompting.

To conserve battery life, such meters remain in a low-power mode (e.g. sleep mode) for a relatively long time (e.g., 30 seconds, 60 seconds, etc.) and wake up (e.g., bubble up) into a higher power mode for a relatively short time (e.g., 500 milliseconds, 1 seconds, etc.) to transmit meter data. Because an endpoint sleeps for a relatively long time and bubbles up periodically, transmitting meter data while a DCU is in range may only happen once or twice every meter data collection period (e.g., monthly, quarterly, etc.). Typically, this is not an issue because, in most cases, the DCU can record the meter data for a reporting period from one meter data transmission from a particular endpoint.

DETAILED DESCRIPTION

Figure 1:
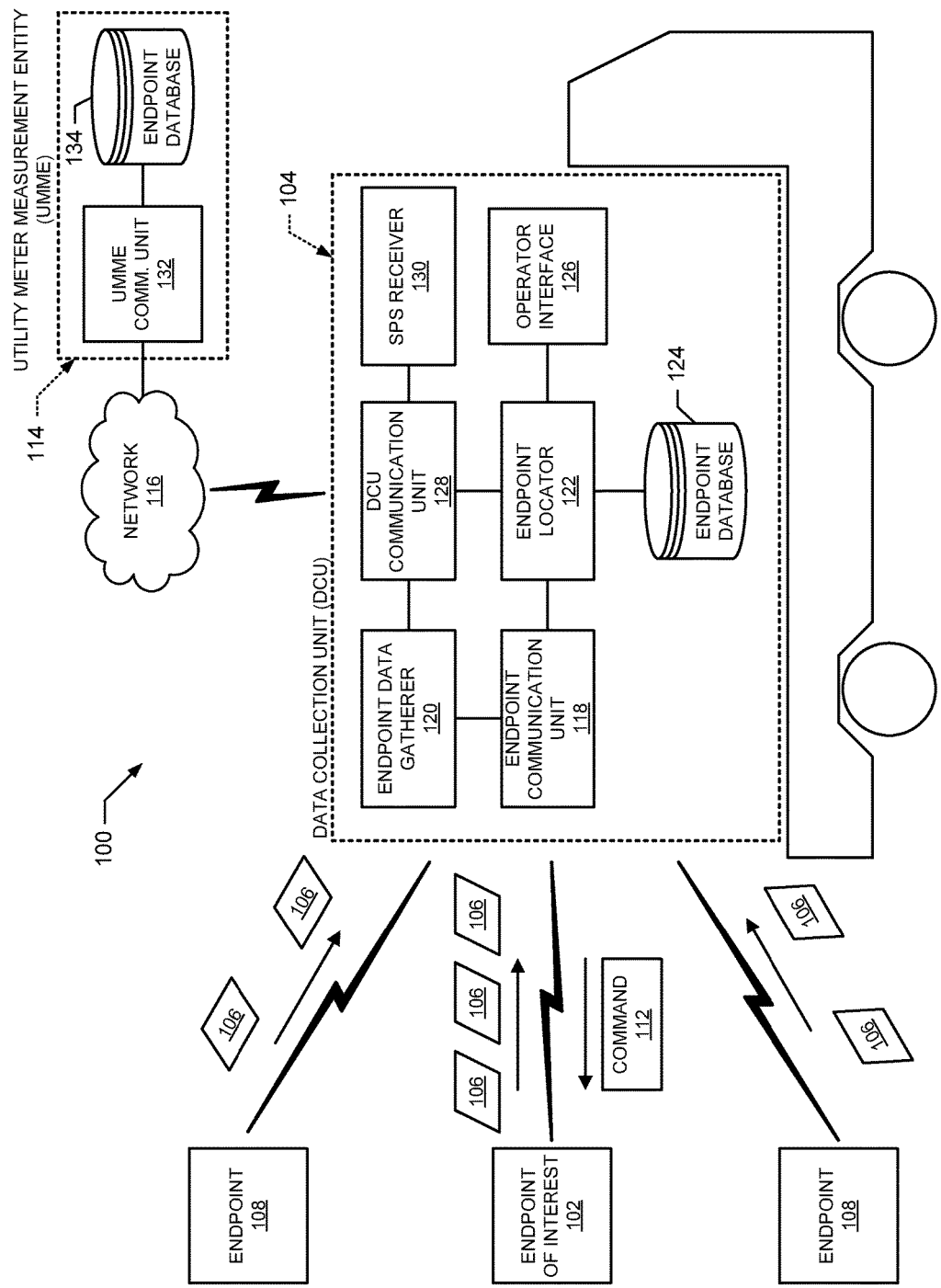
FIG. 1 illustrates an example system constructed in accordance with the teachings of this disclosure to locate endpoints of interest.

Examples disclosed herein may be used to estimate the location of utility meter endpoints of interest. A utility meter measurement entity (UMME) collects meter data (e.g., utility usage data, meter identifier, endpoint identifier, etc.) from endpoints installed on utility meters (e.g., electric meters, gas meters, water meters, etc.) to, for example, monitor and/or charge for utility usage.

DCUs receive the meter data transmitted by endpoints and send (e.g., via a cellular data connection, via a wireless network, via a wired connection, etc.) the collected meter data to the UMME. In some examples, the DCU is part of a fixed network. In some examples, the DCU is mobile (e.g., hand held, attached to a vehicle, attached to a drone, etc.).

To collect meter data, mobile DCUs travel routes (e.g., DCU routes) through geographical areas where endpoints are installed. In some examples, the mobile DCU travels a preplanned route (e.g., with predetermined turn-by-turn directions, etc.). In other examples, the mobile DCU travels an ad hoc route through an assigned geographical area. In both examples, the mobile DCU may maintain a list of the expected endpoints from which meter data should be received along the DCU route. The DCU may use the list of expected endpoints to identify endpoints of interest (e.g., the DCU received a transmission of an endpoint not on the list, etc.) and/or to designate suspected endpoints of interest (e.g., the DCU did not receive a transmission from an endpoint on the list, etc.).

From time to time, the UMME may be unable to account for the location of a utility meter and/or the corresponding endpoint. For example, when an endpoint is installed, the geographic location (e.g., latitude and longitude coordinates, postal address, etc.) of the installation location may be recorded incorrectly in a database of installed endpoints. As another example, the utility meter and/or the corresponding endpoint may have been tampered with and moved to a different location. Because endpoints are powered by batteries, endpoints may continue to transmit even after removed from a meter or the meter is moved.

After traveling a DCU route, if the DCU does not receive meter data from an expected endpoint, that endpoint may be flagged as an endpoint of interest. In some examples, an operator of the DCU may be directed to inspect last-known location of the unaccounted-for endpoint to determine if the endpoint is missing and thus is an endpoint of interest. In other examples, other employees of the UMME (e.g., a maintenance employee, a revenue protection employee, etc.) may be directed to determine if the endpoint is missing and thus is an endpoint of interest. For example, if an endpoint is in the last-known geographical location, but the endpoint's battery is discharged and/or the endpoint is damaged, the endpoint may be designated as requiring maintenance, but would not be designated as an endpoint of interest.

The UMME may maintain a record (e.g., a database, a list, a spreadsheet, etc.) of endpoints of interest. In some examples, the record may be updated and communicated when a DCU returns to the UMME (e.g., via a wired connection, via a wireless connection, etc.). In some examples, the UMME maintains a real time connection (e.g., a cellular connection, etc.) with the mobile DCU to receive and send updates to the record. An endpoint may be designated an endpoint of interest and tracked by the UMME if, for example, the meter data is not received from the endpoint near the recorded installation location. As another example, an endpoint may be designated an endpoint of interest if, after analyzing tamper flags included in the meter data, the UMME determines that the endpoint was likely moved in an unauthorized manner.

As disclosed herein, when a DCU receives meter data from an endpoint, the DCU determines whether the endpoint is an endpoint of interest. In some examples, to determine if the endpoint is an endpoint of interest, the DCU compares an endpoint identifier included in the meter data provided by the endpoint to the record of endpoints of interest. In some examples, the DCU compares the endpoint identifier included in the meter data to the list of expected endpoints and designates the endpoint as an endpoint of interest if the endpoint is not an expected endpoint.

As discussed in further detail below, when an endpoint has been identified and/or designated as an endpoint of interest, the DCU sends a command to that endpoint of interest to increase the periodic interval at which the endpoint of interest transmits meter data. For example, the command may instruct the endpoint of interest to transmit meter data once every four seconds instead of once every thirty seconds. Using the meter data transmissions from the endpoint of interest, the DCU estimates the location of the endpoint of interest. More frequent transmissions allow the DCU to estimate the location of the endpoint of interest quickly because time the DCU is required to linger in the transmission range of endpoint of interest is reduced. Examples of estimating the location of the endpoint of interest are disclosed in U.S. Pat. No. 8,552,910, entitled, "System and Method of Locating Missing Nodes in Networks," issued Oct. 8, 2013, to the instant assignee, which is incorporated herein by reference in its entirety. As discussed in further detail below, the DCU determines when a final estimated location has been generated. In some examples, the DCU informs the operator and/or directs the operator to the final estimated location. In some examples, the DCU stores the final estimated location in association with the corresponding record of the endpoint of interest. After the final estimated location is determined, the DCU allows or commands the endpoint of interest to resume its original periodic interval of transmitting meter data. Because transmitting meter data takes relatively more power compared to the low-power sleep mode, this allows the endpoint of interest to conserve battery life.

FIG. 1 illustrates an example system 100 to identify and locate endpoints of interest 102. In the illustrated example, a data collection unit (DCU) 104 receives meter data 106 from endpoints 108 (e.g. expected endpoints) and the endpoint(s) of interest 102, each of which is installed on a corresponding utility meter (e.g., gas meters, electricity meters, water meters, etc.). The DCU 104 may be in a fixed location as part of a fixed network, or may be mobile (e.g., installed on a truck, built into a drone, be a handheld or backpack mounted unit, etc.).

The example meter data 106 includes utility usage data, a meter identifier (ID), an endpoint ID, and/or tamper indicators, etc. The endpoints 102, 108 send meter data 106 at a periodic interval. When the DCU 104 receives meter data from an endpoint 102, 108, the DCU 104 determines whether it is an endpoint of interest 102. If the endpoint 102, 108 is an endpoint of interest 102, the DCU 104 sends a command 112 to the endpoint of interest to change the periodic interval at which the endpoint of interest 102 transmits meter data 106. More frequent transmissions allow the DCU 104 to calculate an estimated location of the endpoint of interest 102 quicker compared to if the periodic interval remained the same. In addition, the time the DCU 104 is required to linger in range of the endpoint of interest 102 is reduced.

In the illustrated example of FIG. 1, the DCU 104 communicates with a utility meter measurement entity (UMME) 114 through a network 116. In some examples, the DCU 104 communicates with the UMME 114 through the network 116 while the DCU 104 is in the field (e.g., via a cellular network, etc.). In some such examples, the DCU 104 receives an updated list of endpoints of interest 102 from the UMME 114 and/or the DCU 104 sends data (e.g., meter data 106, information related to endpoints of interest 102, etc.) to the UMME 114 while in the field (e.g., while traveling along the DCU route). In some examples, the DCU 104 communicates with the UMME 114 while the DCU 104 is proximate the UMME 104 (e.g. via a Wi-Fi network, via a wired connection, etc.).

In the illustrated example of FIG. 1, the DCU 104 includes an example endpoint communication unit 118, an example endpoint data gatherer 120, an example endpoint locator 122, an example endpoint database 124, an example operator interface 126, and an example DCU communication unit 128. The example endpoint communication unit 118 receives meter data 106 from the endpoints 102, 108 and send commands 112 to the endpoint(s) of interest 102 via RF transmissions. The example endpoint communication module 118 includes hardware (e.g., radio(s), omnidirectional and/or unidirectional antenna(s), etc.) and software (e.g., encoders/decoders, communication buffers, etc.) to communicate with the endpoints 102, 108 in range of the DCU 104.

The example endpoint data gatherer 120 gathers, processes and/or stores meter data 106 received by the example endpoint communication module 118. For example, when the DCU 104 receives meter data 106 from an endpoint 102 that corresponds to an endpoint on the list of expected endpoints, the endpoint data gatherer 120 stores the received meter data 106. In some examples, endpoint data gatherer 120 indicates on the list of expected endpoints that meter data 106 has been received for the corresponding endpoint 102. In some examples, the endpoint data gatherer 120 validates received meter data 106 for transmission errors and/or send requests (via the endpoint communication unit 118) for retransmission to the corresponding endpoint 102.

In the example illustrated in FIG. 1, the endpoint locator 122 determines whether the meter data 106 received by the endpoint communication unit 118 is from an endpoint of interest 102, estimates the location of the endpoints of interest 102, and generates commands 112 to send to the endpoints of interest 102. In some examples, the endpoint locator 122 maintains a list of the endpoints 108 from which meter data 106 should be received along the DCU route (e.g., expected endpoints). In the illustrated example, the endpoint database 124 stores information (e.g., endpoint ID, last known location, etc.) related to endpoints of interest 102 received from the UMME 114.

The example operator interface 126 displays information (e.g., a status of meter data collection, a map, notifications, directions, etc.) to an operator of the example DCU 104. In some examples, the operator interface 126 receives input from the operator.

The example DCU communication unit 128 communicates with the UMME 114. In some examples, the DCU communication unit 128 includes a satellite position system receiver 130 (e.g., a global positioning system (GPS) receiver, a global navigation satellite system (GLONASS) receiver, etc.) to provide the endpoint locator 112 with the satellite position system (SPS) coordinates (e.g., latitude and longitude coordinates) of the DCU 104.

In the illustrated example of FIG. 1, the UMME 114 includes an example UMME communication unit 132 and an example endpoint database 134. The example UMME communication unit 132 receives meter data 106 gathered by the DCU 104, receives information related to endpoints of interest 102 (e.g., new endpoints of interest, final estimated location of endpoints of interest, found endpoints of interest, etc.), and/or sends at least a portion of the endpoint database 134 to the DCU 104. The example endpoint database 134 stores information related to the endpoints of interest 102. In some examples, the endpoint database 134 stores information related to the endpoints of interest 102 collected by multiple DCUs 104.

Figure 2:
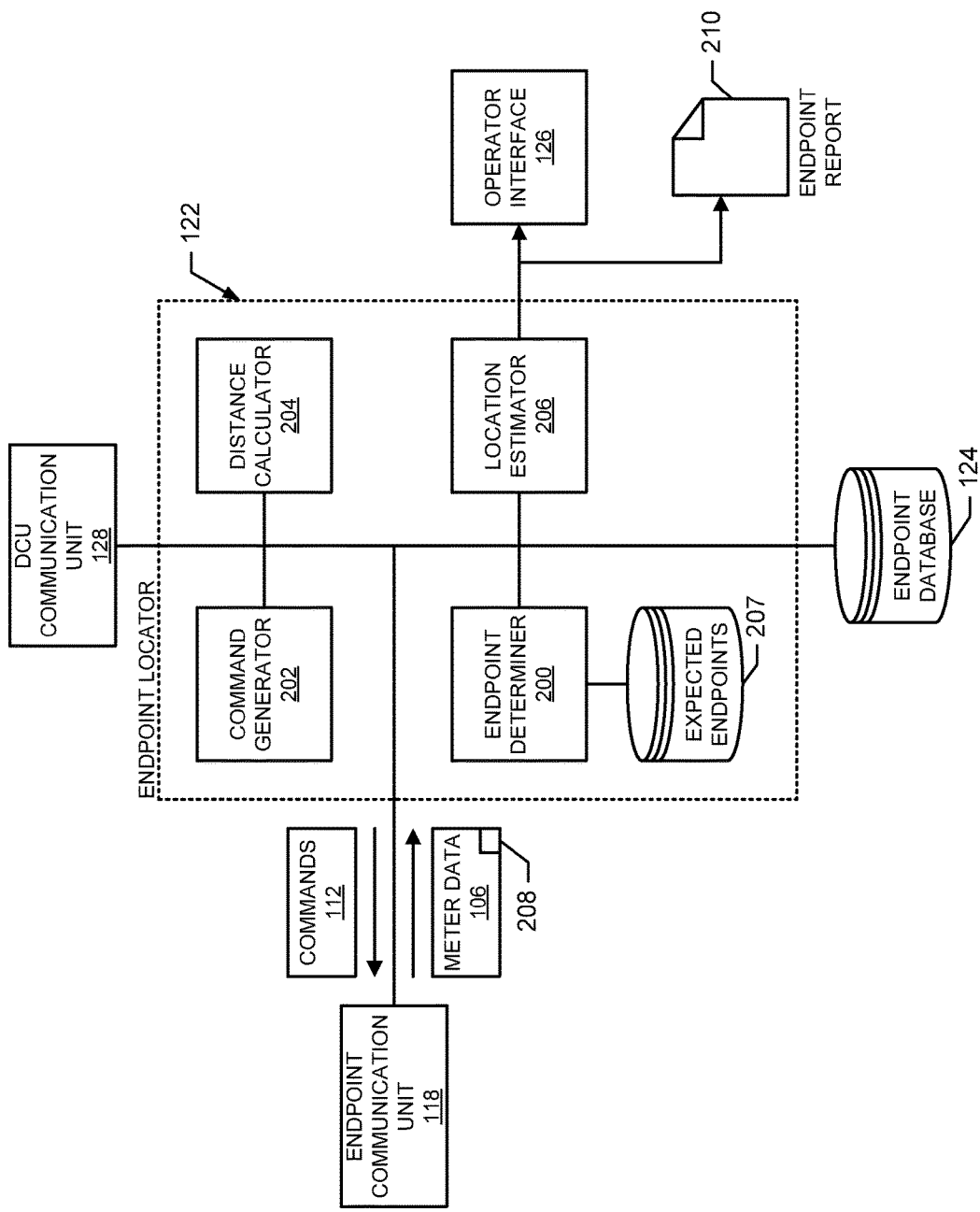
FIG. 2 illustrates an implementation of an example endpoint locator that may be included in the example system of FIG. 1 to estimate the location of endpoints of interest.

FIG. 2 illustrates an example endpoint locator that may be included in the example system of FIG. 1 to estimate the location of endpoints of interest 102 (FIG. 1). In the illustrated example, the endpoint locator 122 includes an example endpoint determiner 200, an example command generator 202, an example distance calculator 204, an example location estimator 206, and an expected endpoint database 207.

The example endpoint determiner 200 of FIG. 2 determines whether the meter data 106 (FIG. 1) received by the endpoint communication unit 118 was sent by an endpoint of interest 102. In some examples, the endpoint determiner 200 compares an endpoint ID 208 included with the meter data 106 to endpoint IDs 208 in the endpoint database 124. In such examples, if the endpoint ID 208 included with the meter data 106 matches an endpoint ID 208 in the endpoint database 124, the endpoint determiner 200 determines that such an endpoint is an endpoint of interest 102. In some examples, the endpoint determiner 200 may maintain the database of expected endpoints 207 for the current DCU route. In such examples, if the endpoint ID 208 included with the meter data 106 is not included in the database of expected endpoints 207, the endpoint determiner 200 determines that the respective endpoint is an endpoint of interest 102. In some examples, the database of expected endpoints 207 includes expected location information (e.g., a geographical area where a particular endpoint should be detected, etc.) for the expected endpoints. In such examples, the endpoint determiner 200 may determine that the respective endpoint is an endpoint of interest 102 if the endpoint is detected outside the expected location.

The example command generator 202 of FIG. 2 marshals a command 112 to send to the endpoint of interests 102 identified by the example endpoint determiner 200. When the endpoint of interest 102 is detected, the command generator 202 generates a command to increase the transmission rate of the endpoint of interest 102. In some examples, when the location estimator 206 determines a final estimated location of the endpoint of interest 102, the command generator 202 generates a command 112 to decrease the transmission rate of the endpoint of interest 102. In the illustrated example, the command generator 202 generates a command 112 based on the capabilities (e.g., based on the type and/or model of the endpoint) of the endpoint of interest 102. In some examples, the command generator 202 generates a command 112 that instructs the endpoint of interest 102 to switch between predefined modes. For example, the endpoint of interest 102 may have a standard mode in which the endpoint bubbles up every thirty seconds and an express mode in which the endpoint bubbles up every four seconds.

In some examples, the command generator 202 generates a command 112 that reprograms periodic transmission interval of the endpoint of interest 102. Additionally, the command 112 may include a period of time after which the endpoint of interest 102 is to resume the periodic transmission interval. In such an example, after the period of time has elapsed, the endpoint of interest resumes the previous periodic transmission interval without receiving an additional command 112 from the DCU 104. In this manner, the endpoint of interest 102 returns to a lower power consumption mode if the DCU 104, for example, leaves the transmission range of the endpoint of interest 102 and/or otherwise cannot send a command 112 to the endpoint of interest 102. In some examples, the command generator 202 may generate an additional command 112 if the final estimated location of the endpoint of interest 102 is not determined before the specified period of time has elapsed. For example, the command generator 112 may generate a command 112 that reprograms the endpoint of interest 102 to transmit every ten seconds for five minutes.

The example distance calculator 204 of FIG. 2 estimates the scalar distance between the endpoint of interest 102 and the DCU 104. In the illustrated example, the distance calculator 204 measures a signal strength indicator (e.g., received signal strength indicator (RSSI) or other signal level parameter, etc.) for the RF transmission containing the meter data 106 from the endpoint of interest 102. The example distance calculator 204 estimates the distance between the DCU 104 and the endpoint of interest 102 based on the measured signal strength indicator. In some examples, the calculated distance is weighted by weighing factors based on, for example, environmental factors (e.g., urban, rural, flat, mountainous, etc.), weather, the speed of the DCU 104, etc. The example distance calculator 204 combines the estimated distance with geographical location (e.g., the SPS coordinates, etc.) of the DCU 104 to generate a triangulation data point.

The example location estimator 206 of FIG. 2 triangulates one or more provisional estimated locations of the endpoint of interest 102 based on the triangulation data points provided by the example distance calculator 204. In some examples, the location estimator 206 does not make an initial provisional estimate of the location of the endpoint of interest 102 until after receiving a threshold number of the triangulation data points. For example, the location estimator 206 may make an initial provisional estimate of the location of the endpoint of interest 102 after receiving four triangulation data points. Upon receiving or retrieving one or more additional triangulation data points, the example location estimator 206 may update the provisional estimated location by triangulating the estimated location using the additional triangulation data points. In some examples, the location estimator 206 provides the provisional estimated location(s) to the operator interface 126. In some examples, when calculating the estimated location, the location estimator 206 accounts for geographical locations that the endpoint of interest 102 is unlikely to be located (e.g., bodies of water, sports stadiums, etc.). For example, the location estimator 206 may discard provisional estimated locations that place the endpoint of interest 102 in a lake or a river.

In the illustrated example of FIG. 2, the location estimator 206 determines a final estimated location. In some examples, the location estimator 206 determines that the latest provisional estimated location is the final estimated location after receiving a threshold number of triangulation data points (e.g., ten triangulation data points). In some examples, the location estimator 206 determines that the latest provisional estimated location is the final estimated location when the provisional estimated location does not change by a threshold amount (e.g., ten feet, twenty feet, etc.) after triangulating with an additional triangulation data point. In some examples, the location estimator 206 provides the final estimated location to the operator interface 126. Additionally or alternatively, the location estimator 206 may include the final estimated location correlated with the endpoint ID 208 on an endpoint report 210. The example endpoint report 210 may be sent to the UMME 114 via the DCU communication unit 128.

In some examples, the location estimator 206 may not determine the final estimated location. In some examples, the DCU 104 may leave the range of the endpoint of interest 102 (e.g., the DCU 104 does not receive additional meter data 106 from the endpoint of interest 102) before determining a final estimated location. In some such examples, the location estimator 206 may, via the operator interface 126, alert the operator and request that the DCU 104 be moved back into range of the endpoint of interest 102. In some such examples, upon returning to the range of the endpoint of interest 102, the command generator 202 may send a command 112 to decrease the periodic transmission interval of the endpoint of interest 102. In some examples, the provisional estimated location may change greater than a threshold distance (e.g., fifteen feet, twenty feet, etc.) after a threshold number of triangulation data points (e.g., ten triangulation data points, twenty triangulation data points, etc.). In some such examples, the location estimator 206 may provide one or more of the provisional estimated locations to the operator interface 126. Additionally or alternatively, one or more of the provisional estimated locations may be included on the endpoint report 210.

While an example manner of implementing example endpoint locator 122 of FIG. 1 is illustrated in FIG. 2, one or more of the elements, processes and/or devices illustrated in FIG. 2 may be combined, divided, re-arranged, omitted, eliminated and/or implemented in any other way. Further, the example endpoint determiner 200, the example command generator 202, the example distance calculator 204, the example location estimator 206 and/or, more generally, the example endpoint locator 122 of FIG. 1 may be implemented by hardware, software, firmware and/or any combination of hardware, software and/or firmware. Thus, for example, any of the example endpoint determiner 200, the example command generator 202, the example distance calculator 204, the example location estimator 206 and/or, more generally, the example endpoint locator 122 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example endpoint determiner 200, the example command generator 202, the example distance calculator 204, the example location estimator 206 and/or the example endpoint locator 122 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example endpoint locator 122 of FIG. 1 may include one or more elements, processes and/or devices in addition to, or instead of, those illustrated in FIG. 2, and/or may include more than one of any or all of the illustrated elements, processes and devices.

Figure 3:
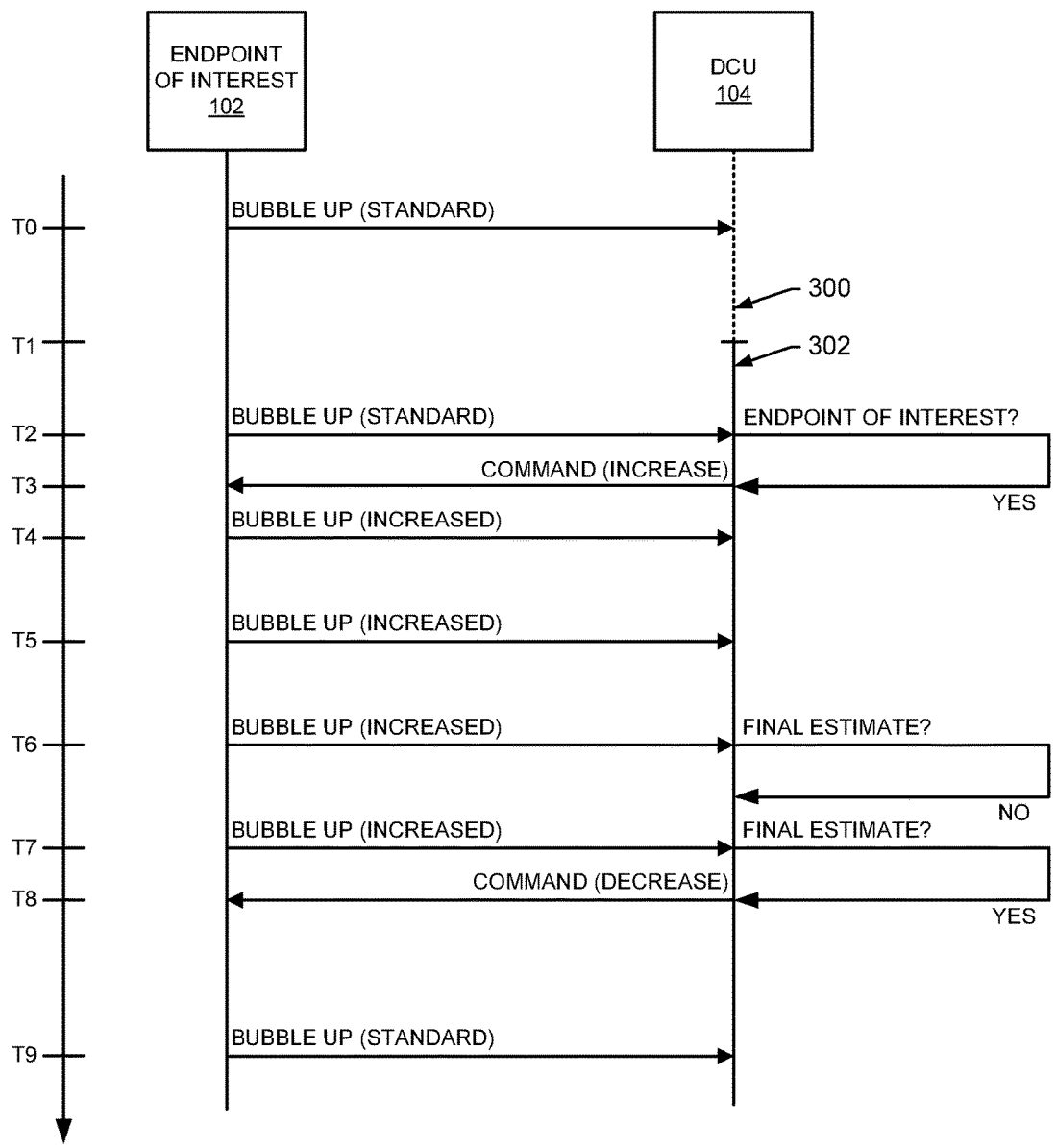
FIG. 3 is an example diagram illustrating an interaction between the endpoint of interest and the data collection unit of FIG. 1.

FIG. 3 is a diagram illustrating an example interaction between the endpoint of interest 102 and the data collection unit 104 of FIG. 1. Initially, at time T0, the endpoint of interest 102 bubbles up (e.g., wakes up and transmits meter data 106) at a standard rate (e.g., once every thirty seconds, etc.) during a period 300 that the DCU 104 is out of RF range. At time T1, the DCU 104 comes within RF range of the endpoint of interest 102. At time T2, the endpoint of interest 102 bubbles up at the standard rate. The DCU 104 receives the RF transmission containing meter data 106 and determines whether the meter data 106 was sent from an endpoint of interest 102. At time T3, after determining that the meter data 106 did come from the endpoint of interest 102, the DCU 104 sends a command 112 to increase the periodic transmission interval to the endpoint of interest 102.

At times T4 and T5, the endpoint of interest 102 sends meter data 106 at the increased periodic transmission interval. In the illustrated example, the period of time between time T4 and time T5 is less than the period of time between time T0 and time T2. In some examples, after receiving the meter data 106, the DCU 104 determines a provisional estimated location. At time T6, after receiving the meter data 106 from the endpoint of interest 102, the DCU 104 determines a provisional estimated location. In the illustrated example, the DCU 104 determines whether the provisional estimated location is the final estimated location (e.g., the location of the provisional estimated location did not change after recalculating with the additional RF transmission of the meter data 106, the DCU 104 received a threshold number of RF transmissions of the meter data 106, etc.). In the illustrated example, at time T6, the DCU 104 determines the final estimated location has not been calculated. At time T7, after receiving an additional RF transmission of meter data 106, the DCU determines that a final estimated location has been calculated. At time T8, DCU 104 sends a command 112 to the endpoint of interest 102 to decrease the periodic transmission interval of the endpoint of interest 102. At time T9, the endpoint of interest 102 bubbles up at the standard rate.

Figure 4:
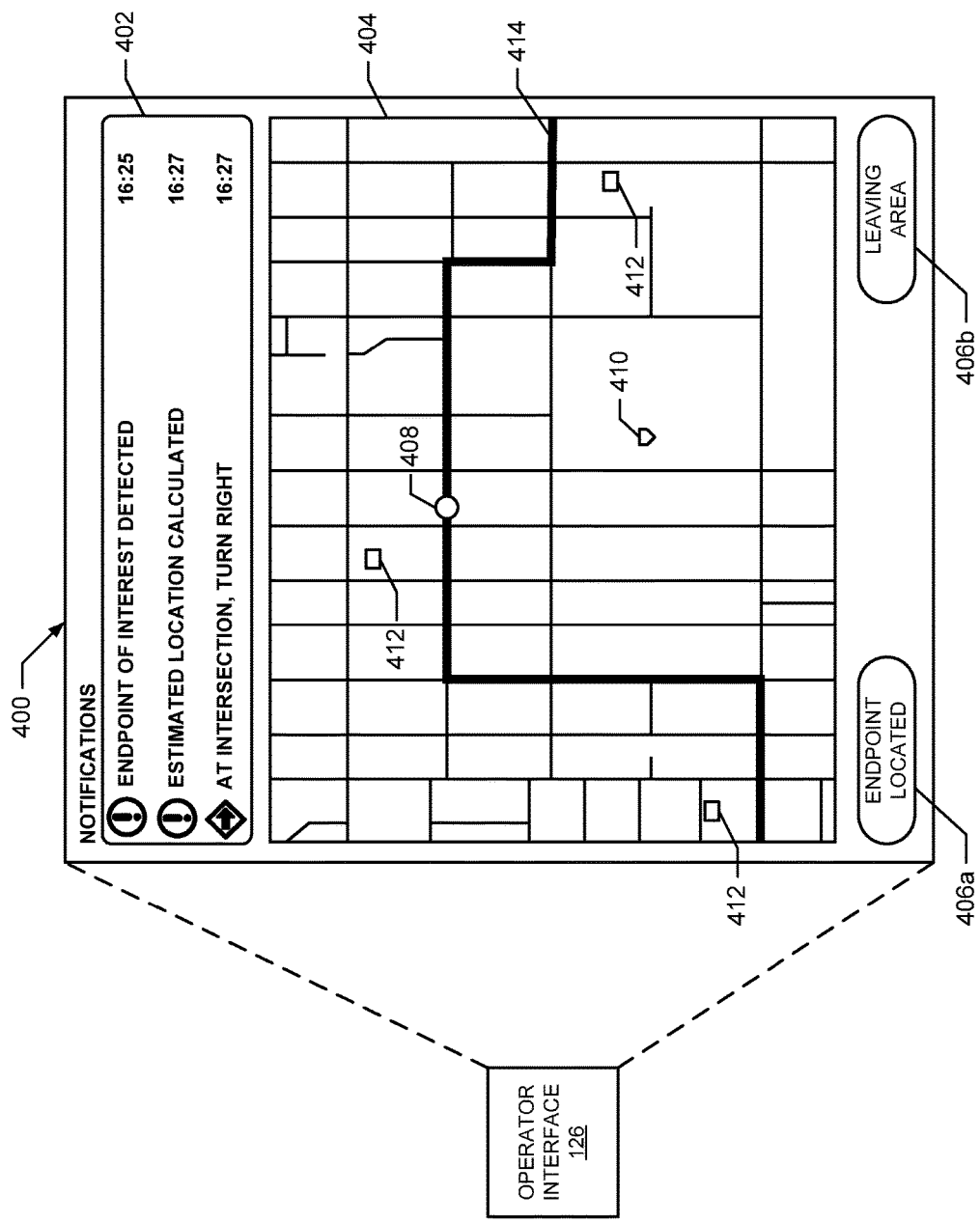
FIG. 4 illustrates an example graphical user interface displayed by the operator interface that may be used to interact with the operator of the data collection unit of FIG. 1.

FIG. 4 illustrates an example graphical user interface (GUI) 400 displayed by the operator interface 126 (FIG. 1) that may be used to interact with the operator of the DCU 104 of FIG. 1. In the illustrated example, the GUI 400 has an example notification window 402, an example map display 404, and example user inputs 406a-406b. The GUI 400 communicates the status of the DCU 104 generally, and/or the endpoint locator 122 (FIGS. 1 and 2) specifically. The example notification window 402 displays information related to locating endpoints of interest 102 (FIG. 1). For example, the notification window 402 may alert the operator that an endpoint of interest 102 has been detected (e.g., an RF transmission containing meter data 106 including the endpoint ID 208 has been received, etc.) and/or may alert the operator that a provisional and/or final estimated location has been calculated. In some examples, the notification window 402 alerts the operator that the DCU 104 has moved out of range of the endpoint of interest 102 (e.g., RF transmissions from the endpoint of interest 102 are no longer being received, etc.). In some examples, the notification window 402 provides turn-by-turn directions for the DCU route of the DCU 104. In some such examples, the notification window 402 provides turn-by-turn directions to locate the endpoint of interest 102 (e.g., after a final estimated location has been calculated, etc.).

In the illustrated example of FIG. 4, the map display 404 displays a map of the geographic region around the DCU 104. In the illustrated example, the map display 404 displays a DCU marker 408 to represent the location of the DCU 104 and an estimated location marker 410 to represent the estimated location of the endpoint of interest 102. In some examples, the map display 404 displays end point marker(s) 412 to represent locations of endpoint(s) 108 along the DCU route. In some examples, the map display 404 displays a DCU route marker 414 to represent the DCU route the DCU 104 is scheduled to traverse to collect meter data 106 from endpoints 108 along the route. In some examples, the endpoint locator 122 may instruct the operator interface 126 to change the DCU route marker 414 to direct the DCU 104 to locations that may narrow down the location of the endpoint of interest 102.

In the illustrated example of FIG. 4, user inputs 406a-406b allow the operator to input information to the DCU 104. The user inputs 406a-406b may take the form of input elements, such as buttons, text boxes, drop down menus, etc. For example, the GUI 400 may display a button (e.g., the user input 406a) that allows the operator to indicate that he/she has physically located the endpoint of interest 102. In some examples, a button (e.g., the user input 406b) may be displayed that allows the operator to indicate that the DCU 104 is leaving the area. In some such examples, after the operator indicates that the DCU 104 is leaving the area, the endpoint locator 122 may send a command 112 (FIG. 1) to the endpoint(s) of interest 102 to decrease their periodic transmission interval.

Figure 5:
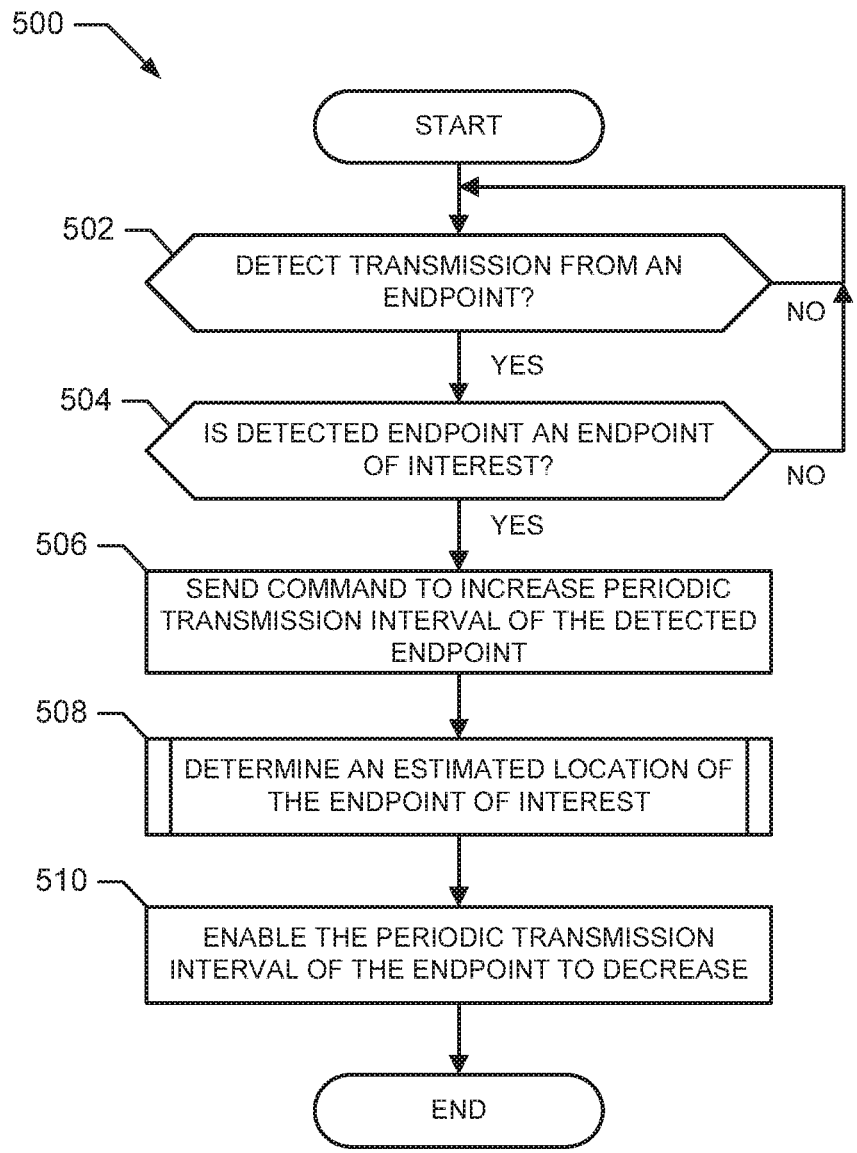
FIG. 5 is a flow diagram representative of example machine readable instructions that may be executed to implement the example endpoint locator of FIGS. 1 and 2 to estimate the location of the endpoint of interest.
Figure 6:
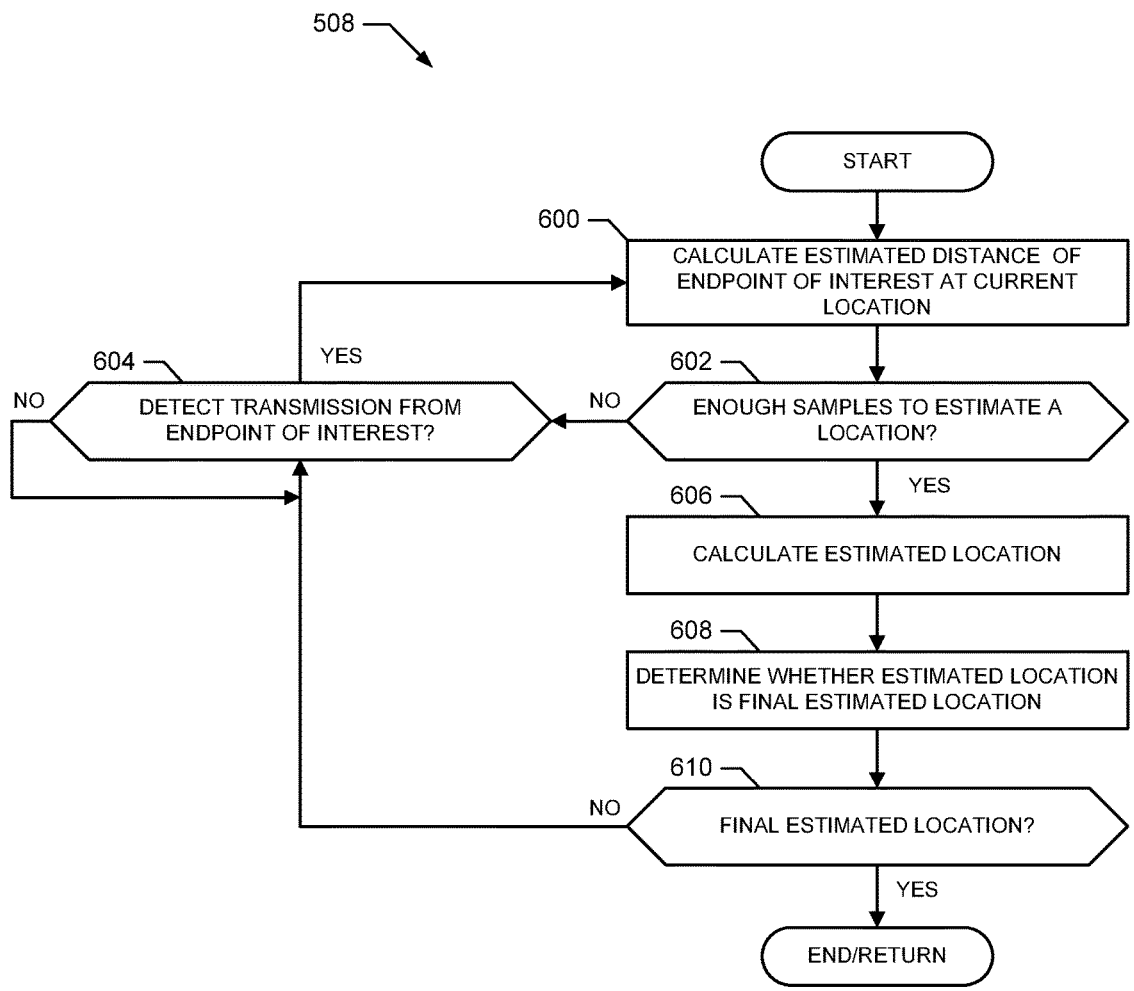
FIG. 6 is a flow diagram representative of example machine readable instructions that may be executed to implement the example endpoint locator of FIGS. 1 and 2 to estimate the location of the endpoint of interest.

Flowcharts representative of example machine readable instructions for implementing the example endpoint locator 122 of FIGS. 1 and 2 are shown in FIGS. 5 and 6. In this example, the machine readable instructions comprise a program for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 5 and 6, many other methods of implementing the example endpoint locator 122 of FIGS. 1 and 2 may alternatively be used. For example, the order of execution of the blocks may be changed, and/or some of the blocks described may be changed, eliminated, or combined.

As mentioned above, the example processes of FIGS. 5 and 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5 and 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 5 is a flow diagram representative of example machine readable instructions 500 that may be executed to implement the example endpoint locator 122 of FIGS. 1 and 2 to estimate the location of the endpoint of interest 102 (FIG. 1). The endpoint determiner 200 determines whether a transmission containing meter data 106 was received (e.g., via the endpoint communication unit 118 of FIG. 1) from an endpoint 102, 108 (block 502). If a transmission containing meter data 106 was received, the endpoint determiner determines whether the endpoint is an endpoint of interest 102 (block 504). Otherwise, if a transmission containing meter data 106 was not received, the endpoint determiner waits for the next transmission.

The endpoint determiner 200 determines whether the detected transmission containing the meter data 106 (block 502) corresponds to an endpoint of interest 102. In some examples, the endpoint determiner 200 determines that the detected endpoint is an endpoint of interest 102 based on the endpoint ID 208 included in the meter data 106. For example, the endpoint determiner 200 may determine that the endpoint is an endpoint of interest 102 if an endpoint ID 208 matches an endpoint ID stored in an endpoint database 124. Additionally or alternatively, if the endpoint ID 208 is not included in a database of expected endpoints 207, endpoint determiner 200 may determine that the endpoint is an endpoint of interest 102. If the transmission containing meter data 106 corresponds to an endpoint of interest 102, the command generator 202 generates a command 112 to increase the periodic transmission interval of the endpoint of interest 102 (block 504). Otherwise, if the transmission containing meter data 106 does not correspond to an endpoint of interest 102, the endpoint determiner 200 waits for the next transmission.

The command generator 202 sends a command 112 (e.g., via the endpoint communication unit 118 of FIG. 1) to increase the periodic transmission period to the endpoint of interest 102 (block 506). The distance calculator 204 and/or the location estimator 206 determines an estimated location (e.g., the estimated location 410 of FIG. 4) of the endpoint of interest 102 (block 508). The command generator 202 enables the transmission rate of the endpoint of interest 102 to decrease (block 510). In some examples, the command generator 202 sends a command 112 to the endpoint of interest 102 to decrease the periodic transmission interval of the endpoint of interest 102. The example program 500 then ends.

FIG. 6 is a flow diagram representative of example machine readable instructions 508 that may be executed to implement the example endpoint locator 122 of FIGS. 1 and 2 to estimate the location of the endpoint of interest 102 (FIG. 1). The distance calculator 204 (FIG. 2) calculates an estimated distance based on a measured signal strength indicator of the RF transmission from the endpoint of interest 102 (block 600). In some examples, the distance calculator 204 correlates the calculated distance with SPS coordinates of the current location of the DCU 104 to generate a triangulation data point. The location estimator 206 determines whether enough triangulation data points have been generated to determine an estimated location (block 602). In some examples, the determination is based on a threshold number of triangulation data points. If the location estimator 206 determines that enough triangulation data points have been generated to determine an estimated location, the location estimator 204 calculates an estimated location of the endpoint of interest 102 (block 602). Otherwise, if not enough triangulation data points have been generated to determine an estimated location, the distance calculator 204 waits for another transmission from the endpoint of interest 102 (block 604).

The distance calculator 204 determines whether another transmission has been detected from the endpoint of interest 102 (block 604). If another transmission has been detected from the endpoint of interest 102, the distance calculator 204 calculates a distance of the endpoint of interest (block 600). Otherwise, if another transmission has not been detected from the endpoint of interest 102, the distance calculator 204 waits for another transmission from the endpoint of interest 102 (block 604).

The location estimator 206 triangulates an estimated location of the endpoint of interest 102 using the triangulation data points generated by the distance calculator 204 (block 606). The location estimator 206 then determines whether the calculated estimated location is the final estimated location (block 608). In some examples, the location estimator 206 determines that the estimated location is the final estimated location after receiving a threshold number of triangulation data points (e.g., ten triangulation data points) from the distance calculator 204. In some examples, the location estimator 206 determines that the estimated location is the final estimated location when the estimated location does not change by a threshold amount (e.g., ten feet, twenty feet, etc.) after calculating the estimated location with an additional triangulation data point. In some examples, the location estimator 206 determines that the estimated location is the final estimated location when, after receiving a threshold number of triangulation data points (e.g., ten triangulation data points) from the distance calculator 204, the estimated location changes by more than a threshold amount (e.g., ten feet, twenty feet, etc.). If the location estimator 206 determines that the estimated location is the final estimated location (block 610), the example program 508 ends and/or control returns to a calling function or process such as the example process of FIG. 5. Otherwise, if the location estimator 206 determines that the estimated location is not the final estimated location, the distance calculator 204 waits for another transmission from the endpoint of interest 102 (block 604).

Figure 7:
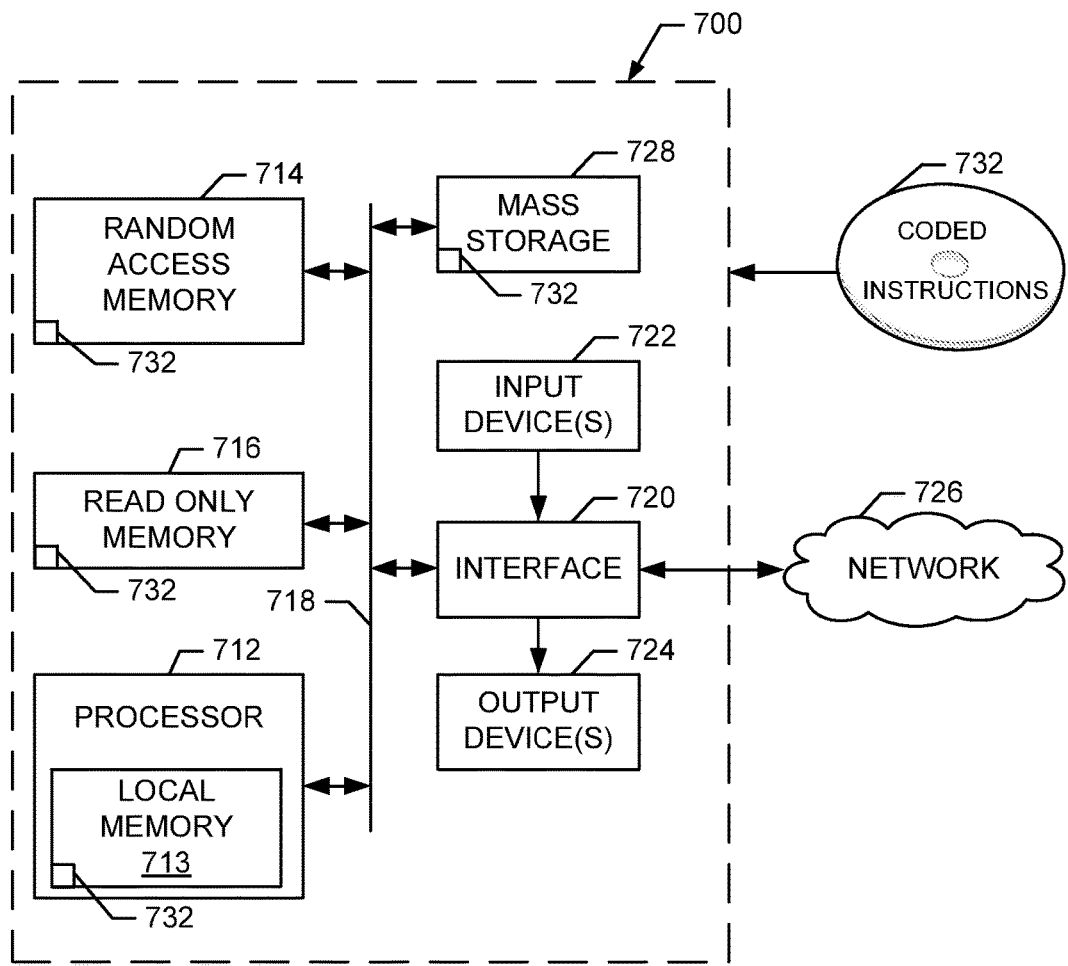
FIG. 7 is a block diagram of an example processor system that may execute the example machine readable instructions represented by FIGS. 5 and/or 6 to implement the example apparatus of FIGS. 1, 2 and/or 4.

FIG. 7 is a block diagram of an example processor platform 700 capable of executing the instructions of FIGS. 5 and 6 to implement the endpoint locator 122 of FIGS. 1 and 2. The processor platform 700 can be, for example, a personal computer, a laptop computer, a mobile device (e.g., a cell phone, a smart phone, a tablet such as an iPad™), a personal digital assistant (PDA), or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 of FIGS. 5 and 6 may be stored in the mass storage device 728, in the local memory 713, in the volatile memory 714, in the non-volatile memory 716, and/or on a removable tangible computer readable storage medium such as a CD or DVD.

From the foregoing, it will be appreciated that examples have been disclosed which reduce the time which the data collection unit is required to search for a missing endpoint.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method for locating an endpoint of a utility metering system by a mobile data collection unit, the method comprising:
    in response to detecting a transmission from the endpoint, determining if the endpoint is an endpoint of interest based on comparing an identifier of the endpoint to a list of expected endpoints: and if the endpoint is the endpoint of interest:
sending a first command to the endpoint of interest to increase a transmission rate of meter data from the endpoint,
calculating an estimated scalar distance of the endpoint of interest based on measuring signal strengths of subsequent transmissions of the meter data from the endpoint at the increased transmission rate,
triangulating an estimated location of the endpoint of interest based on the scalar distance and geographical data, wherein the geographical data includes data pertaining to whether the endpoint of interest is in a rural or urban environment, and
in response to said triangulating the estimated location, sending a second command to the endpoint of interest to decrease the transmission rate of the meter data from the endpoint of interest.

2. The method as defined in claim 1, wherein the identifier is included in the transmission of the meter data.

3. The method as defined in claim 1, wherein the first command includes instructions that cause the endpoint to change from a first preset mode to a second preset mode.

4. The method as defined in claim 1, wherein the first command includes instructions that specify the transmission rate.

5. The method as defined in claim 1, wherein the first command includes instructions that specify an interval after which the transmission rate of the endpoint of interest is to decrease prior to the sending of the second command.

6. The method as defined in claim 1, wherein the endpoint of interest includes a utility meter.

7. The method as defined in claim 6, further including upon determining that the endpoint of interest is out of a communication range, sending an alert to an operator associated with the mobile data collection unit.

8. The method as defined in claim 1, wherein the triangulating the estimated location of the endpoint of interest includes correlating a calculated distance of the endpoint of interest relative to the mobile data collection unit to generate at least one triangulation data point.

9. The method as defined in claim 1, wherein the geographical data further includes terrain data.

10. A method for locating an endpoint associated with a utility meter by a mobile data collection unit, the method comprising:
moving the mobile data collection unit;
in response to detecting a transmission from the endpoint, determining whether the endpoint is an endpoint of interest based on comparing an identifier of the endpoint to a list of expected endpoints:
if the endpoint is the endpoint of interest:
sending a first command to the endpoint of interest to increase a transmission rate of meter data from the endpoint;
determining estimated scalar distances of the endpoint of interest based on measured signal strengths of subsequent transmissions from the endpoint of interest while the mobile data collection unit is being moved until a final estimated location is triangulated based on the scalar distances and geographical data, wherein the geographical data includes data pertaining to whether the endpoint of interest is in a rural or urban environment; and
in response to said triangulating the final estimated location of the endpoint of interest, sending a second command to the endpoint of interest to decrease the transmission rate of the meter data from the endpoint of interest.

11. The method as defined in claim 10, wherein one of the estimated scalar distances is the final estimated location when the estimated scalar distances do not change after a threshold number of estimates.

12. The method as defined in claim 10, wherein one of the estimated scalar distances is the final estimated location after a threshold number of estimates have been determined.

13. The method as defined in claim 10, wherein the identifier is included in the transmission of the meter data.

14. The method as defined in claim 10, wherein the first command includes instructions that cause the endpoint to change from a first preset mode to a second preset mode.

15. The method as defined in claim 10, wherein the first command includes instructions that specify the transmission rate.

16. The method as defined in claim 10, wherein the second command is to instruct the endpoint to change from a first preset mode to a second preset mode.

17. The method as defined in claim 10, wherein the first command includes instructions that specify an interval after which the transmission rate of the endpoint is to decrease prior to the second command being sent.

18. The method as defined in claim 10, further including displaying potential locations of the utility meter at a display of the mobile data collection unit.

19. A non-transitory tangible computer readable storage medium comprising instructions which, when executed, cause a machine to at least:
in response to detecting a transmission from an endpoint of a utility metering system by a mobile data collection unit, determine whether the endpoint is an endpoint of interest based on comparing an identifier of the endpoint to a list of expected endpoints:
if the endpoint is the endpoint of interest:
send a first command to the endpoint of interest to increase a transmission rate of meter data from the endpoint;
calculate estimated scalar distances of the endpoint of interest using signal strengths of subsequent transmissions from the endpoint of interest until a final estimated location is triangulated based on the scalar distances and geographical data, wherein the geographical data includes data pertaining to whether the endpoint of interest is in a rural or urban environment; and
in response to said triangulating the final estimated location of the endpoint of interest, send a second command to the endpoint of interest to decrease the transmission rate of the meter data from the endpoint of interest.

20. The tangible computer readable storage medium as defined in claim 19, wherein one of the estimated scalar distances is the final estimated location when the estimated location do not change after a threshold number of estimates.

21. The tangible computer readable storage medium as defined in claim 19, wherein one of the estimated scalar distances is the final estimated location after a threshold number of estimates have been determined.

22. The tangible computer readable storage medium as defined in claim 19, wherein the first command includes instructions that cause the endpoint of interest to change from a first preset mode to a second preset mode.

23. The tangible computer readable storage medium as defined in claim 19, wherein the first command includes instructions that specify an interval after which the transmission rate of the endpoint of interest is to decrease prior to the second command being sent.

* * * * *